United States Patent [19]

Laughner

[11] Patent Number: 5,369,154

[45] Date of Patent: * Nov. 29, 1994

[54] POLYCARBONATE/AROMATIC POLYESTER BLENDS CONTAINING AN OLEFINIC MODIFIER

[75] Inventor: Michael K. Laughner, Lake Jackson, Tex.

[73] Assignee: The Dow Chemical Company, Midland, Mich.

[*] Notice: The portion of the term of this patent subsequent to Mar. 23, 2010 has been disclaimed.

[21] Appl. No.: 960,482

[22] Filed: Oct. 9, 1992

Related U.S. Application Data

[63] Continuation-in-part of Ser. No. 703,934, May 22, 1991, abandoned, which is a continuation-in-part of Ser. No. 508,997, Apr. 12, 1990, abandoned.

[51] Int. Cl.$^5$ .................. C08L 69/00; C08L 67/02
[52] U.S. Cl. .................. 523/436; 524/445; 524/449; 524/451; 524/504; 524/505; 525/64; 525/67; 525/92; 525/133; 525/148
[58] Field of Search .......... 524/445, 449, 451, 504, 524/505; 523/436; 525/64, 67, 92, 133, 148

[56] References Cited

U.S. PATENT DOCUMENTS

| 3,864,428 | 2/1975 | Nakamura et al. | 260/873 |
| 4,090,996 | 5/1978 | Gergen | 525/92 |
| 4,180,494 | 12/1979 | Fromuth et al. | 260/40 |
| 4,267,096 | 5/1981 | Bussink et al. | 525/439 |
| 4,320,212 | 3/1982 | Liu | 525/148 |
| 4,554,315 | 11/1985 | Chung et al. | 525/67 |
| 4,657,973 | 4/1987 | Endo et al. | 525/439 |
| 4,774,286 | 9/1988 | Taubitz et al. | 525/148 |
| 4,857,604 | 8/1989 | Argarwal | 525/439 |
| 4,859,738 | 8/1989 | Farah et al. | 525/67 |
| 4,897,448 | 1/1990 | Romance | 525/67 |
| 4,904,729 | 2/1990 | Laughner | 525/67 |
| 4,912,163 | 3/1990 | Lausberg et al. | 525/148 |
| 5,112,913 | 5/1992 | Horiuchi | 525/148 |
| 5,196,479 | 3/1993 | Laughner | 525/67 |

FOREIGN PATENT DOCUMENTS

| 107048 | 5/1984 | European Pat. Off. . |
| 304040 | 2/1989 | European Pat. Off. . |
| 352822 | 1/1990 | European Pat. Off. . |
| 386674 | 9/1990 | European Pat. Off. . |
| 235456 | 10/1986 | Japan . |
| 252268 | 11/1986 | Japan | 525/148 |
| 184051 | 8/1987 | Japan | 525/67 |
| 05117 | 11/1985 | WIPO . |

OTHER PUBLICATIONS

Abstract of "The Mechanical Properties of Elastomer Modified Polycarbonate/Poly(ethylene terephthalate) Blend" by Liao, Guo and Chang, p. 791, Proceedings of the 13th R.O.C. Polymer Symposium, 1990.

Abstract of "The Mechanical Properties of Elastomer Modified Polycarbonate/Poly(ethylene terephthalate) Blend" by Liao, Guo and Chang, p. 1009, Proceedings of the 1990 Annual Conference of the Chinese Society of Material Science, 1990.

Derwent Abstract No. 87–207,007.
Derwent Abstract No. 87–266,737.
Derwent Abstract No. 89–107,951.
Derwent Abstract No. 90–140,501.

*Primary Examiner*—David Buttner

[57] ABSTRACT

A polycarbonate blend of good impact and flexural strength, good heat distortion and weldline properties, low gloss, and good solvent resistance prepared by admixing with polycarbonate an aromatic polyester, an olefinic epoxide-containing modifier, and one or more members of the group conssisting of a thermoplastic elastomer and a rubber-modified styrene/acrylonitrile copolymer. Optionally, a graft copolymer of the core-shell type may be used as an additional impact modifier.

18 Claims, No Drawings

POLYCARBONATE/AROMATIC POLYESTER BLENDS CONTAINING AN OLEFINIC MODIFIER

This application is a continuation-in-part of Ser. No. 07/703,934, filed May 22, 1991, which is a continuation-in-part of Ser. No. 07/508,997, filed April 12, 1990, both now abandoned.

FIELD OF THE INVENTION

This invention relates to blends of polycarbonate and polyester, and relates particularly to polycarbonate/polyester blends which, when molded, display a desirably high level solvent resistance and imapct and flexural strength, but which are also characterized by low gloss.

BACKGROUND OF THE INVENTION

Polycarbonate has found many uses because, in general, it combines a high level of heat resistance and dimensional stability with good insulating and noncorrosive properties, and it is easily molded. However, its ductility is often reduced by contact with organic solvents such as gasoline. In blends of polycarbonate with other polymers such as polyester, especially in those blends also containing an impact modifier, a balance of properties is consequently sought for the purpose of arriving at a useful level of both impact and solvent resistance.

References are known which disclose compositions of polycarbonate, polyester, an epoxide-containing modifier and a grafted impact modifying copolymer. Among these are Chung, U.S. Pat. No. 4,554,315, Lausberg, U.S. Pat. No. 4,912,163, EP 386,674-A and JP 62-184,051-A (1987). However, no recognition exists in any of these references of the possibility of strengthening polycarbonate while maintaining a useful level of solvent resistance, low gloss and good flexural modulus and weldline strength by employing in place of the grafted copolymer a thermoplastic elastomer, or a rubber-modified sytrene/acrylonitrile copolymer, particularly that which is mass produced.

It has been found, however, that the use of a thermoplastic elastomer or a rubber-modified sytrene/acrylonitrile copolymer in a blend of polycarbonate, polyester and an epoxy-containing modifier does result in a composition which, when molded, possesses a good balance of processing and physical properties, for example a desirably high level of solvent and impact resistance, as well as low gloss.

SUMMARY OF THE INVENTION

In one aspect, this invention involves a composition of matter which contains
 (a) an aromatic polycarbonate,
 (b) a crystalline aromatic polyester,
 (c) a thermoplastic epoxide-containing copolymer, having a glass transition temperature of less than 0° C., prepared from (i) one or more olefin monomers, and (ii) at least one vinyl monomer carrying at least one epoxide group, and
 (d) a thermoplastic block copolymer containing a rigid block polymerized from a vinyl aromatic compound and a rubbery block polymerized from a diene.

In a further aspect, this invention involves a composition of matter which contains
 (a) an aromatic polycarbonate,
 (b) a crystalline aromatic polyester,
 (c) a thermoplastic epoxide-containing copolymer, having a glass transition temperature of less than 0° C., prepared from (i) one or more olefin monomers, and (ii) at least one vinyl monomer carrying at least one epoxide group, and
 (d) a rubber-modified styrene/acrylonitrile copolymer containing less than forty percent rubber by weight.

The compositions of this invention are useful, for example, in the production of films, fibers, extruded sheets, multi-layer laminates and molded or shaped articles of virtually all varieties, especially appliance and instrument housings, automobile body panels and other components for use in the automotive and electronics industries. The methods of this invention are useful for preparing compositions and molded articles having applications which are the same as or similar to the foregoing.

DETAILED DESCRIPTION OF THE INVENTION

The compositions of this invention are those in which (a) polycarbonate has been admixed in a blended composition with (b) a crystalline aromatic polyester, (c) an olefinic epoxide-containing modifier having a $T_g$ less than 0° C., and one or more members of the group consisting of (d) a thermoplastic elastomer and (e) a rubber-modified sytrene/acrylonitrile copolymer containing less than forty weight-percent rubber. Suitable ranges of content for components (a), (b), (c), (d) and (e) in the compositions of this invention, expressed in percent of the total weight of all components present in the composition, are as follows:

(a) polycarbonate from about 5 percent to about 95 percent, and preferably from about 10 percent to about 85 percent;
 (b) crystalline aromatic polyester from about 5 percent to about 95 percent, and preferably from about 10 percent to about 70 percent;
 (c) epoxide-containing modifier from about 0.1 percent to about 20 percent, and preferably from about 1 percent to about 15 percent;
 (d) thermoplastic elastomer up to about 25 percent, and preferably from about 1 percent to about 15 percent;
 (e) rubber-modified styrene/acrylonitrile copolymer up to about 50 percent, and preferably from about 1 percent to about 25 percent.

As a component (f), other impact modifiers, such as a core-shell graft copolymer containing greater than forty percent (40%) rubber, may optionally be used in these compositions as well, and, when used, may be present in an amount of up to about 25 percent, preferably from about 1 percent to about 15 percent, and more preferably less than 5 percent, by weight of all components present in the composition.

Compositions prepared within the above ranges of content possess not only desirable levels of environmental stress failure resistance, but possess as well impact and flexural strength and heat distortion properties which are superior to those of compositions not containing a thermoplastic elastomer and/or a rubber-modified styrene/acrylonitrile copolymer.

Preparation of the compositions of this invention can be accomplished by any suitable mixing means known in the art. Typically the substances to be admixed with polycarbonate are dry blended in particulate form with sufficient agitation to obtain thorough distribution thereof within the polycarbonate. If desired, the dry-blended formulation can further, but need not, be melt mixed in an extruder. Mixing rolls, a dough-mixer or a Banbury mixer can also be used in the blending. Alternatively, a master batch formulation can be prepared containing polycarbonate or polyester and the substances to be admixed or blended with it wherein polycarbonate or polyester is present in only a minor proportion, e.g. 20%. The master batch is then available for storage or shipment in commerce, and can be diluted with additional polycarbonate or polyester at the time of use. The compositions of this invention can be formed or molded using conventional techniques such as compression, injection, calendering, vacuum forming, extrusion and/or blow molding techniques, alone or in combination. The compositions can also be formed into films, fibers, multi-layer laminates or extruded sheets on any machine suitable for such purpose.

Component (a), the polycarbonates suitable for use in the present invention are those which have a glass transition temperature exceeding 135° C., and they may be produced by any of the conventional processes known in the art for the manufacture of polycarbonates. Generally, aromatic polycarbonates are prepared by reacting an aromatic dihydric phenol with a carbonate precursor, such as phosgene, a haloformate or a carbonate ester.

A preferred method for preparing suitable polycarbonates involves the use of a carbonyl halide, such as phosgene, as the carbonate precursor. This method involves passing phosgene gas into a reaction mixture containing an activated dihydric phenol, or a nonactivated dihydric phenol and an acid acceptor, such as pyridine, dimethyl aniline, quinoline and the like. The acid acceptor may be used undiluted or diluted with inert organic solvents, such as methylene chloride, chlorobenzene or 1,2-dichloroethane. Tertiary amines are advantageous since they are good solvents as well as acid acceptors during the reaction.

The temperature at which the carbonyl halide reaction proceeds may vary from below 0° C. to about 100° C. The reaction proceeds satisfactorily at temperatures from room temperature to 50° C. Since the reaction is exothermic, the rate of phosgene addition may be used to control the temperature of the reaction. The amount of phosgene required will generally depend upon the amount of dihydric phenol present. Generally speaking, one mole of phosgene will react with one mole of dihydric phenol to form the polycarbonate and two moles of HCl. The HCl is in turn taken up by the acid acceptor.

Another method for preparing the aromatic polycarbonates useful in this invention involves adding phosgene to an alkaline aqueous suspension of dihydric phenols. This is preferably done in the presence of inert solvents such as methylene chloride, 1,2dichloroethane and the like. Quaternary ammonium compounds may be employed to catalyze the reaction.

Yet another method for preparing such aromatic polycarbonates involves the phosgenation of an agitated suspension of an anhydrous alkali salt of an aryl diol in a nonaqueous medium such as benzene, chlorobenzene or toluene. The reaction is illustrated by the addition of phosgene to a slurry of the sodium salt of, for example, Bisphenol A in an inert polymer solvent such as chlorobenzene.

Generally speaking, a haloformate such as the bishaloformate of Bisphenol A may be used in place of phosgene as the carbonate precursor in any of the methods described above.

When a carbonate ester is used as the carbonate precursor in the polycarbonate-forming reaction, the materials are reacted at temperatures in excess of 100° C. for times varying from 1 to 15 hours. Under such conditions, ester interchange occurs between the carbonate ester and the dihydric phenol used. The ester interchange is advantageously consummated at reduced pressures on the order of from about 10 to about 100 millimeters of mercury, preferably in an inert atmosphere such as nitrogen or argon.

Although the polymer-forming reaction may be conducted in the absence of a catalyst, one may, if desired, employ a typical ester exchange catalyst, such as metallic lithium, potassium, calcium or magnesium. The amount of such catalyst, if used, is usually small, ranging from about 0,001% to about 0.1%, based on the weight of the dihydric phenols employed.

In the solution methods of preparation, the aromatic polycarbonate emerges from the reaction in either a true or pseudo solution depending on whether an aqueous base or pyridine is used as an acid acceptor. The copolymer may be precipitated from the solution by adding a polymer nonsolvent, such as heptane or isopropanol. Alternatively, the polymer solution may be heated, typically under reduced pressure, to evaporate the solvent.

The methods and reactants described above for preparing carbonate polymers suitable for use in the practice of this invention are discussed in greater detail in Schnell, U.S. Pat. No. 3,028,365; Campbell, U.S. Pat. No. 4,384,108; Glass, U.S. Pat. No. 4,529,791; and Grigo, U.S. Pat. No. 4,677,162, each being incorporated as a part hereof.

A preferred aromatic polycarbonate is characterized by repeated units corresponding to the general formula:

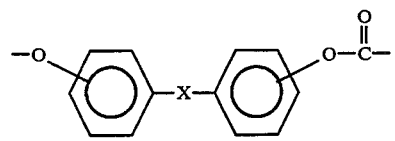

wherein X is a divalent, linear or cyclic $C_1-C_{15}$ hydrocarbon radical, a single bond, -O-, -S-, -S$_2$-, -SO-, -SO$_2$-, or -CO-. Each aromatic ring may additionally contain, instead of hydrogen, up to four substituents such as $C_1-C_4$ alkyl hydrocarbon or alkoxy radicals, aryl or aryloxy radicals, or halo radicals.

Although the polycarbonates mentioned above, such as those derived from 2,2-bis(4-hydroxyphenyl)propane ("Bisphenol-A" or "Bis-A"), 1,1-bis(4-hydroxyphenyl)-1-phenyl ethane ("Bisphenol-A-P" or "Bis-A-P") or Bis(hydroxyphenyl) fluorene, can each be employed in this invention as a homopolymer, the carbonate polymers used herein can also be derived from two or more bisphenols, or two or more acid- or hydroxy-terminated reactants such as dicarboxylic acids or alkylene glycols, or from two or more different dihydroxy compounds, or mixtures of any of the foregoing, in the event a carbonate copolymer or inpolymer, such as a copolyester/-carbonate is desired, rather than a homopolymer.

Copolymers can be formed, for example, when a bisphenol is reacted with a carbonic acid derivative and a polydiorganosiloxane containing α,ω-bishydroxyaryloxy terminal groups to yield a siloxane/carbonate block copolymer [as are discussed in greater detail in Paul, U.S. Pat. No. 4,569,970, incorporated as a part hereof], or when a bisphenol is reacted with a bis(ar-haloformylaryl) carbonate to yield an alternating copolyestercarbonate. The bis(ar-haloformylaryl) carbonate is formed by reacting a hydroxycarboxylic acid with a carbonic acid derivative under carbonate forming conditions, and the copolyestercarbonates are discussed in greater detail in Swart, U.S. Pat. No. 4,105,533, incorporated as a part hereof. Branched polycarbonate, which may also be useful herein, may be obtained by adding to the reaction mixture a tri- or polyfunctional monomer such as a tri- or tetrafunctional phenol or carboxylic acid (or a derivative such as an acyl halide or anhydride), a bisphenol containing carboxylic acid side groups, or a nitrogen-containing compound such as cyanuric chloride, or compounds containing a mixture of such groups. Preferred branching agents are trimellitic acid or pyromellitic dianhydride.

The term "polycarbonate" as used herein, and in the claims appended hereto, should therefore be understood to include carbonate homopolymers, carbonate copolymers (as described above), and/or blends of carbonate homopolymers and/or carbonate copolymers.

Component (b), the crystalline aromatic polyester used in this invention, may be made by a variety of methods. Although the self-esterification of hydroxycarboxylic acids is known, direct esterification, which involves the reaction of a diol with a dicarboxylic acid with the resulting elimination of water, is a more frequently used method for commercial production, giving an -[-AABB-]- polyester. Although the presence of a catalyst such as p-toluene sulfonic acid, a titanium alkoxide or a dialkyltin oxide is helpful, the primary driving force behind the direst esterification reaction is heat. Temperatures applied exceed the melting points of the reactants and typically approach the boiling point of the diol being used, and usually range from about 150° C. to about 280° C. An excess of the diol is typically used, and once all of the acid has reacted with diol, the excess diol is removed by distillation with the application of additional heat under reduced pressure. The ester of the diacid initially formed from the diol, having -OH end groups, undergoes alcoholysis and polymerization to form polymeric esters and the diol is split out as a by-product and removed from the reaction zone. The reaction is typically carried out in the presence of an inert gas.

Alternatively, but in like manner, ester-forming derivatives of a dicarboxylic acid can be heated with a diol to obtain polyesters in an ester interchange reaction. Suitable acid derivatives for such purpose are esters, halides, salts or anhydrides of the acid. When a bis ester of the diacid is used for purposes of the interchange reaction, the alcohol from which the ester is formed (the alcohol to be displaced) should be lower boiling than the diol to be used for formation of polyester (the displacing alcohol). The reaction can then be conveniently run at a temperature at or below the boiling point of the displacing alcohol but well above that of the displaced alcohol, and is usually run in a temperature range similar to that for direct esterification. The ester interchange reaction is typically run in the presence of a diluent, for example, an inert organic solvent such as chloroform or tetrachloroethane, and in the presence of a base, for example a tertiary organic base such as pyridine. Typical catalysts used when ester interchange involves alcoholysis are weak bases such as carbonates or alkoxides of sodium, lithium, zinc, calcium, magnesium or aluminum, whereas catalysts such as antimony oxide, titanium butoxide or sodium acetate are often used when acidolysis occurs in the interchange reaction. Diol derivatives such as an acetate can be used effectively when it is desired to conduct acidolysis.

Maintenance of high temperature is an important aspect of esterification, particularly toward the end of the reaction. As a consequence, thermal ester scission competes with polymer growth as the prevailing result of the process, which places an upper limit on the molecular weight which can be achieved through the use of melt polymerization. The molecular weight of polyester can be increased by adding a chain coupling agent, such as diphenyl carbonate, to the melt reaction mixture just prior its completion. Or, to achieve higher weight by solid state polymerization, polyester product of intermediate weight can be heated in a vacuum or stream of inert gas, first to a temperature where it crystallizes and then to a temperature close to its melting point.

Polyesters can also be produced by a ring-opening reaction of cyclic esters or lactones, for which organic tertiary bases and alkali and alkaline earth metals, hydrides and alkoxides can be used as initiators. Advantages offered by this type of reaction are that it can be run at lower temperatures, frequently under 100° C., and there is no need to remove a condensation product from the reaction.

Whether a polyester is crystalline or amorphous is typically a function of the symmetry of the starting materials from which it is made. When one or more hydrogens on the diol and/or the diacid (or derivative) which are reacted to form a polyester are replaced by larger radicals such as alkyl or halogen, the intermolecular spacing of the resulting molecules may be disrupted if the presence of the substituent creates assymetric or irregularly shaped molecules. The component containing the substituent may also be combined into the polyester molecule in random orientation, resulting in structural irregularity in the polymer chain. Factors which can influence crystallization of ring-containing polyesters are the directionality of the ester groups, the stereochemistry of the rings and variations in symmetry where the rings are bridged. For example, a poly(alkylene isophthalate) crystallizes only with difficulty, and a polyester prepared from phthalic acid typically does not crystallize at all. However, where the amount of monomer containing the asymmetry is small in relation to the remainder of the starting materials, the portion of the resulting polyester molecule which suffers from structural irregularity will also be small, and crystallization will typically not be impeded. A crystalline material may be identified by the endotherm it displays on a differential scanning calorimeter. A preferred polyester for use in this invention is a crystalline polyester having a melting point of 254°–260° C.

Suitable reactants for making the polyester used in this invention, in addition to than hydroxycarboxylic acids, are diols and dicarboxylic acids either or both of which can be aliphatic or aromatic. A polyester which is a poly(alkylene alkanedicarboxylate), a poly(alkylene phenylenedicarboxylate), a poly(phenylene alkanedicarboxylate), or a poly(phenylene phenylenedicarboxylate) is therefore appropriate for use herein. Alkyl portions of the polymer chain can be substituted with, for example, halogens, alkoxy groups or alkyl side chains and can contain divalent heteroatomic groups (such as -O-, -S- or -SO$_2$-) in the paraffinic segment of the chain. The chain can also contain unsaturation and non-aromatic rings. Aromatic rings can contain substituents such as halogens, alkoxy or alkyl groups, and can be joined to the polymer backbone in any ring position and directly to the alcohol or acid functionality or to intervening atoms.

Typical alkylene diols used in ester formation are the $C_2$-$C_{10}$ glycols, such as ethylene-, propylene-, and butylene glycol. Alkanedicarboxylic acids frequently used are oxalic acid, adipic acid and sebacic acid. Diols which contain rings can be, for example, a 1,4-cyclohexylenyl glycol or a 1,4-cyclohexane-dimethylene glycol, resorcinol, hydroquinone, 4,4'-thiodiphenol, bis-(4hydroxyphenyl)sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention, and are all included in the term "polyester". For example, use of cyclohexanedimethylol together with ethylene glycol in esterification with terephthalic acid forms a clear, amorphous copolyester ("PETG") of particular interest. Also contemplated are PCTG; liquid crystalline polyesters derived from mixtures of 4hydroxybenzoic acid and 2-hydroxy-6-naphthoic acid; or mixtures of terephthalic acid, 4-hydroxybenzoic acid and ethylene glycol; or mixtures of terephthalic acid, 4hydroxybenzoic acid and 4,4'-dihydroxybiphenyl.

Aromatic polyesters such as the poly(alkylene phenylenedicarboxylates) polyethylene terephthalate and polybutylene terephthalate, or mixtures thereof, are particularly useful in this invention. These polyesters typically have an intrinsic viscosity between about 0.35 and about 1.2, preferably about 0.35 and 1.1, and are more easily processed than polyesters with higher intrinsic viscosities.

Methods and materials useful for the production of polyesters, as described above, are discussed in greater detail in Whinfield, U.S. Pat. No. 2,465,319, Pengilly, U.S. Pat. No. 3,047,539 and Russell, U.S. Pat. No. 3,756,986, each of which is incorporated herein in its entirety.

Component (c), the olefinic epoxide-containing modifier used in this invention, is a polymer which has a glass transition temperature ($T_g$) less than 0° C. $T_g$ is the temperature or temperature range at which a polymeric material shows an abrupt change in its physical properties, including, for example, mechanical strength. $T_g$ can be determined by differential scanning calorimetry.

The epoxide-containing modifier of this invention is formed as a copolymer from (i) at least one olefin monomer such as ethylene, propylene, isopropylene, butylene or isobutylene, or at least one conjugated diene such as butadiene, and the like, or mixtures thereof; and (ii) at least one vinyl (i.e. olefinically unsaturated, including vinylidene) or olefin monomer carrying at least one epoxide group. Optionally, component (i) may itself be a copolymer prepared from one or more olefin monomers, such as those described above, as well as other vinyl monomer(s), but containing a sufficient amount of the olefin monomer(s) to impart a $T_g$ of less than 0° C. to the epoxide-containing modifier. In addition to components (i) and (ii), the epoxide-containing copolymer may also be formed from a component (iii), at least one other vinyl (i.e. olefinically unsaturated, including vinylidene) monomer not carrying an epoxide group.

The epoxide-containing copolymer is a thermoplastic which is formed by polymerization through the double bond of each component (i) and each component (ii). The epoxide groups, although free to react, are not pendant as a grafted chain since components (i) and (ii) together form a generally linear polymer. Component (iii) may be copolymerized with components (i) and (ii) into the generally linear chain, or it may be grafted as a homopolymeric branch onto a generally linear chain prepared from components (i) and (ii).

Representative vinyl (i.e. olefinically unsaturated, including vinylidene) monomers useful as component (iii) in forming the polymeric epoxide-containing modifier of this invention include the following: vinyl compounds (especially when they bear a polar, electronegative group or functionality) such as vinyl toluene, alphamethyl styrene, halogenated styrene; those containing nitrile groups such as copolymers of acrylonitrile, methacrylonitrile or alpha-halogenated acrylonitrile; a $C_1$-$C_8$ alkyl acrylate such as ethyl acrylate, butyl acrylate, hexyl acrylate or hydroxy ethyl acrylate; a $C_1$-$C_8$ alkyl methacrylate such as mehtyl methacrylate or hexyl methacrylate; other esters of the $C_1$-$C_6$ aliphatic or cycloaliphatic alcohols, especially the $C_1$-$C_4$ aliphatic or cycloaliphatic alcohols; an acrylic or methacrylic acid; the vinylidene monomers, especially when they bear a polar, electronegative group or functionality such as a halogen group, or an organic group having a double or triple bond such as phenyl, carboxy, cyano or the like; vinyl esters or vinyl ethers; alkenyl-aromatic compounds such as styrene and substituted derivatives thereof; maleimides; mononitriles having alpha-beta-olefinic unsaturation and lower alkyl or halogen substituents; esters of olefinically unsaturated carboxylic acids; aliphatic vinyl compounds such as vinyl chloride, vinylidene chloride, acrylic and methacrylic acid esters, amides and nitriles, vinyl acetate, vinyl propionate and vinyl benzoate; vinyl-methyl-ether, vinyl-ethyl-ether and vinyl-isobutyl-ether; and aromatic vinyl compounds such as styrene, alpha-methyl styrene, vinyl toluene, p-ethylstyrene, 2,4-dimethyl styrene, o-chlorostyrene and 2,5-dichlorostyrene; vinyl esters; vinyl ethers; alpha-olefins; vinyl toluenes; vinyl xylenes; the maleates; the fumarates; and the like; or mixtures of two or more of any of the foregoing. In general, vinyl and vinylidene monomers from groups such as the vinyl and vinylidene -esters,ethers, -organic acids, -aromatics, -alcohols, anhydrides, -halides, -nitriles and -amides; or mixtures of any of the foregoing may be used. Additionally, any one or more of the foregoing monomers may be copolymerized with carbon monoxide.

Vinyl monomers such as the foregoing may also be copolymerized with the olefin/diene portion of the modifier to prepare the optional form of component (i); or, when carrying an epoxide group, may be used as component (ii).

Olefinically unsaturated monomers containing epoxide groups suitable for use as component (ii) of the polymeric modifier include, for example, glycidyl esters of unsaturated carboxylic acids (e.g. glycidyl methacrylate); glycidyl ethers of unsaturated alcohols (e.g. allyl-glycidyl-ether) and of alkenylphenols (e.g. isopropenyl-phenyl-glycidylether); and vinyl and allyl esters of epoxycarboxylic acids (e.g. vinyl esters of epoxidized oleic acid). In general, all compounds which contain both a polymerizable unsaturated group and reactive epoxide groups in the molecule can be used for the manufacture of the epoxide-containing modifier of the invention.

Copolymers of about 1-25% (by weight) of glycidyl methacrylate, about 40-95% of ethylene, and, optionally, up to about 40% of vinyl acetate or butyl acrylate are particularly suitable for use herein as the polymeric epoxide-containing modifier.

Copolymers containing epoxide groups may be obtained according to known processes, for example by radical polymerization in chlorobenzene at 80° C. in 50% strength solution. For instance, monomers such as those listed above are dissolved in an appropriate solvent, such as benzene, chlorobenzene or toluene, and polymerized at a temperature of about 80° C. by adding azobisisobutyronitrile, whereby oxygen is excluded. After the monomers have been reacted, the solvent used is distilled off (e.g., chlorobenzene at 100° C. and 20 torr) and the residue is dried in vacuum at 100° C. and then powdered. The epoxide-containing modifier of this invention can also be prepared in gas phase under conditions suitable for polymerizing an olefin. For example, the polymer can be made in either a tubular reactor or a stirred autoclave, where heated, pressurized feed streams of olefin or vinyl monomer gas, peroxide free-radical initiator and chain transfer agent are injected into the reaction device. The reaction of formation usually occurs at 1,500-3,000 atm (152-304 MPa) and at a temperature usually not exceeding 300° C., as known in the art.

The molecular weight of the polymeric epoxide-containing modifier is typically between about 10,000 and about 500,000, preferably between about 30,000 and about 200,000. A mixture of epoxide-containing modifiers may be used as well.

Component (d), the thermoplastic elastomers useful in this invention, are those which have a $T_g$ less than 0° C. Thermoplastic elstomers are characterized in that they can, for example, be melted, for mixing or other purposes, and recooled without undergoing any change in properties; and further in that they retain their properties after having been dissolved and reformed upon removal of solvent.

The thermoplastic elastomers suitable herein are also characterized by the randomness of the shape and size they take on when mixed by shearing forces with the other components making up the compositions of this invention, especially when heat is applied during such mixing. Although a thermoplastic elastomer may be present in the polymer composition matrix as generally elongated, linear ribbons or bands, chain coiling can yield globule-shaped segments of thermoplastic elastomer in the matrix. For example, when a hydrogenated vinyl aromatic/diene block copolymer is used as the thermoplastic elastomer in the presence of an olefinic epoxide-containing modifier, the vinyl aromatic/diene block copolymer is coalesced into an irregularly shaped particulate form, and locates within the olefinic epoxide-containing modifier, which is itself in particulate form. The particles of olefinic epoxide-containing modifier are not of uniform size or shape, and they range in size from about 0.1 to 4 microns, and have an average size of about 1 to 2 microns.

The random shape and size assumed in the polymer compositon matrix by a thermoplastic elastomer is to be distinguished from the shape and size assumed by optional component (f), a core-shell graft copolymer. A core-shell graft copolymer is uniformly present in the polymer matrix in a bead shape both before and after mixing by application of shearing forces, whether heat is used or not, and is typically present in a rather narrow size range, for example 0.05-0.8 microns. The retention of this core-shell, or spherical, shape by the graft copolymer, even after heating and mixing, results from the fact that the outer layers, which surround the core, are formed by grafting appropriate monomers onto the core and are partially crosslinked. A core-shell graft polymer, such as is used as component (f), cannot be melted and recooled without a change in structure and/or properties because the graft copolymer will tend to decompose or crosslink, and the bead-shaped segments of graft polymer will tend to agglomerate upon melting, making dispersion of them by mixing very difficult.

A thermoplastic elastomer useful as an impact modifier in the compositions of this invention may be based generally on a long-chain, hydrocarbon backbone, which may or may not be grafted with one or more vinyl monomers. Representative examples of a few such thermoplastic elastomers are as follows: butyl rubber: chlorosulfonated polyethylene rubber; ethylene/propylene copolymer and ethylene/propylene/diene copolymer, which may be grafted with one or more vinyl monomers; fluorinated olefins, including polytetrafluoroethylene; neoprene rubber; nitrile rubber; polybutadiene and polyisoprene.

Polyether rubbers include epichlorohydrin elastomers, which can be prepared either by a coordination polymerization mechanism using an aluminum alkyl-water catalyst in a hydrocarbon solvent, or in solution using benzene, toluene or methylene chloride as the solvent. Propylene oxide elastomers can also be prepared in solution, by copolymerization with allyl glycidyl ether, using a coordination catalyst such as diethyl zinc water. Polyether rubbers, as described above, are discussed in greater detail in Vandenberg, U.S. Pat. No. 3,634,303 and Vandenberg, U.S. Pat. No. 3,639,267.

Other thermoplastic elastomers include an SBR rubber, a copolymer of styrene and butadiene, which typically contains about 23% styrene. Of the butadiene content, about 18% of it is cis, 65% is trans and 17% is vinyl. The monomers themselves can be randomly dispersed along the backbone, or blocks of each monomer can be randomly dispersed. SBR rubbers, as described above, are discussed in greater detail in Zelinski, U.S. Pat. No. 2,975,160 and Zelinski, U.S. Pat. No. 3,281,383, which are incorporated herein.

Thermoplastic elastomers also include linear A-B-A tri- or A-B diblock copolymers, or radial A-B block copolymers, which have a rigid block "A" having a $T_g$ above room temperature (approximately 23°-25° C.) and a rubbery block "B" having a $T_g$ below room temperature. Examples of typical pairings of materials to form the respective A and B blocks of a block copolymer thermoplastic elastomer are shown in Table I.

TABLE I

| Block Copolymer Pairings | |
|---|---|
| A block | B block |
| polystyrene | polybutadiene |
|  | polyisoprene |
|  | ethylene/butylene copolymer |
| polyethylene | ethylene/butylene copolymer |
| polyurethane | polyester |
|  | polyether |
|  | polycaprolactam |
| polyester | polyether |
| polypropylene | EPDM rubber |

Block copolymer thermoplastic elastomers can be prepared, for example, by anionic polymerization using an alkyl-lithium initiator. Hydrogenated styrene/ethylene-butylene/styrene block copolymers, such as that available from Shell Oil Co. as Kraton ™ G-1651 rubber, are preferred. A poly(butylene terephthalate)/poly(tetramethylene oxide) copolymer such as Hytrel ™ 5526 copolymer, available from DuPont, and a polyurethane/polyester block copolymer available from The Dow Chemical Company, are also preferred.

Styrene-diene block copolymers, as described above, are discussed in greater detail in Holden, U.S. Pat. No. 3,265,766 and Prudene, U.S. Pat. No. 3,949,020, which are incorporated herein. Thermoplastic elastomers based on urethane are discussed in greater detail in Schollenberger, U.S. Pat. No. 3,015,650 and Saunders, U.S. Pat. No. 3,214,411; and those based on copolyester-ether are discussed in Witsiepe, U.S. Pat. No. 3,651,014, each of which is incorporated herein.

Component (e), the styrene/acrylonitrile copolymer ("SAN") suitable for use in this invention, is that which is rubber-modified. An example of a rubber-modified styrene/acrylonitrile copolymer which can be advantageously used in this invention is an elastomeric-thermoplastic composite such as an acrylonitrile-butadiene-styrene copolymer ("ABS"). The elastomeric portion of such composite is usually dispersed as discrete particles in a matrix made up of the thermoplastic portion.

ABS is typically formed by the grafting of an SAN copolymer onto a polybutadiene substrate latex. The polybutadiene forms particles of rubber—the elastomeric component—which are dispersed as a discrete phase in a thermoplastic matrix formed by the SAN. The rubber content of the rubber-modified styrene/acrylonitrile copolymer used in this invention is less than forty percent (40%) by weight, preferably 1–25% by weight, more preferably 1–20% by weight, and most preferably 1–10% by weight.

This structural aspect of a rubber-modified styrene/acrylonitrile copolymer—the dispersion of rubber particles in a compatible thermoplastic phase or matrix—is more important than the precise monomer content. The composite can be manufactured from nothing other than acrylonitrile, butadiene and styrene, or other monomers can be substituted or mixed in with them. Some of the monomers which are frequently substituted for or intermixed with acrylonitrile, butadiene and styrene are mentioned below in connection with the three usual methods of manufacturing ABS. What is set forth below concerning methods of making the elastomeric/thermoplastic composite used as a rubber-modified styrene/acrylonitrile copolymer in this invention from acrylonitrile, butadiene and styrene applies equally to the other forms of said elastomeric/thermoplastic composite which result from variation in the monomer mix. The elastomeric/thermoplastic composite used as a rubber-modified styrenic thermoplastic resin in this invention can be made from any of the various monomers, and can be made by any of the various methods, which are included below in the discussion relating specifically to the manufacture of ABS.

One method for making ABS resin is emulsion polymerization wherein the first step is the production of a rubber substrate latex in an aqueous emulsion. The substrate results from polymerization, which can be initiated by organic peroxides, persulfates, iron, sugar, or peroxide redox systems, of 1,3-butadiene alone or in combination with other monomers. Butadiene can be copolymerized with either styrene or acrylonitrile to form the substrate, but numerous other comonomers yield equivalent results. In general, any mixture containing a butadiene-1,3 hydrocarbon and a copolymerizable compound containing a single olefinic double bond, in proportions such that an unsaturated elastomeric copolymer—a rubber—is formed on polymerization of the mixture in aqueous emulsion, is appropriate. For example, there may be used mixtures containing a predominant amount of butadiene-1,3, isoprene, 2,3-dimethyl butadiene-1,3 or piperylene, or a combination of two or more of these and a lesser amount of one or more of the following monomers: styrene, alpha-methyl styrene, p-methoxy styrene, p-chloro styrene, dichloro styrene, vinyl naphthalene and other alkenyl substituted aromatic compounds of the formula

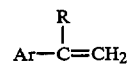

$$Ar-\underset{\underset{R}{|}}{C}=CH_2$$

wherein Ar is an aromatic radical having its connecting valence on a ring carbon atom with R being as follows: hydrogen or alkyl; acrylonitrile, methacrylonitrile, ethacrylonitrile, alphachloro acrylonitrile, methyl methacrylate, ethyl methacrylate, isobutyl methacrylate, methyl acrylate, propyl acrylate, butyl acrylate, octyl acrylate, methyl alpha-chloro acrylate, methacrylamide, acrylamide, N,N-diethyl acrylamide and other nitriles, amides and alkyl esters of alpha-methylene aliphatic monocarboxylic acids; substituted aromatic maleimides such as N-phenyl maleimide; diethyl fumarate, diethylchloromaleate, vinylidene chloride, methyl vinyl ketone, methyl isopropenyl ketone, vinyl pyridines, vinyl furan, vinyl carbazole, isobutylene, ethylene, and the like. It is preferred that, in the preparation of the rubber latex, the proportion of butadiene to other monomers be in the range of about 2/1 to about 15/1.

After formation of the rubber latex substrate, the rubber latex substrate and styrene and acrylonitrile monomers are subjected to further aqueous emulsion wherein the rubber latex substrate makes up from about 4% to less than about 40% of the rubber-monomer mass charged to the reactor. The concentration of styrene is usually about 1.5 to 3.5 times that of acrylonitrile. However other monomers such as methacrylonitrile, divinylbenzene, a-methyl styrene, p-methyl styrene, methyl methacrylate, N-phenyl maleimide, chlorinated and brominated styrenes, and methyl-, ethyl- or n-butylacrylate, or mixtures thereof, may also be in conjunction with styrene and acrylonitrile. Organic peroxides, azo compounds, persulfates, or redox systems are usually used to initiate polymerization. SAN is formed, some of which is grafted to the rubber latex substrate, and some of which is free. The latex containing both the grafted rubber and the free SAN is then mixed with a coagulant solution, heated and agitated to produce discrete particles of ABS resin. The slurry containing those particles is dewatered in a centrifuge, and the resin is dried. Methods for making ABS resin by emulsion polymerization, as described above, are discussed in greater detail in Childers, U.S. Pat. No. 2,820,773 and Calvert, U.S. Pat. No. 3,238,275, each being hereby incorporated as a part hereof.

When ABS is made by suspension polymerization there is provided a process for preparing a polymer resin which comprises subjecting a stable diene rubber latex to emulsion state graft polymerization, pre-formed elastomeric component (i.e. a rubber), usually a polybutadiene or a butadiene/styrene copolymer, is dissolved in a mixture of styrene and acrylonitrile. The rubber component may be one of the several mentioned above with respect to emulsion polymerization of ABS, or may be polyisoprene, polycyclopentadiene, natural rubber, chlorinated rubber or copolymers of butadiene with isobutylene. However, the preferred rubber component is a linear 1,4 polybutadiene having about a 35% to 50% cis content.

The preferred ratio of styrene to acrylonitrile in the styrene-acrylonitrile solution is about 90/10 to about 60/40, and in the preferred recipe the rubber component constitutes from about 1% to less than about 40% of the product. As with the emulsion process described above, numerous substances will function in a manner equivalent to that of styrene and may be substituted therefor, to-wit: alphamethyl styrene, or other substituted vinyl aromatics such as vinyl-toluene, vinylxylene, vinylethyl benzene or vinylchloro benzene. Methacrylonitrile is another alkenyl cyanide monomer which will serve in the place of acrylonitrile.

The rubber component, monomers and initiator are charged to the reaction vessel and polymerization ensues until a conversion rate of about 15% to about 30% is reached, resulting in the production of a prepolymer. Phase inversion occurs, and the rubber precipitates from solution and becomes the discontinuous phase dispersed as particles ranging from 0.5 to 5 $\mu$m in size. The prepolymer is then placed in a suspension reactor in an aqueous solution containing a suspending agent, initiator and chain transfer agent. Typical suspending agents are carboxymethyl cellulose, polyvinyl alcohol, methyl cellulose, sulfonated polystyrenes, polyglycol ethers and hydroxyethyl cellulose. Typical initiators for the polymerization which occurs during suspension are t-butyl perbenzoate, di-t-butyl peroxide, dibenzoyl peroxide, t-butyl peracetate or t-butylperoxy isopropyl carbonate. Agitation of the solution helps complete the polymerization. The process is completed by dewatering the slurry in a centrifuge, and moisture content is further reduced by flash drying. Manufacture of ABS by the suspension process, as described above, is discussed in greater detail in Carrock, U.S. Pat. No. 3,515,692 and Ackerman, U.S. Pat. No. 4,151,128, each being hereby incorporated as a part hereof.

In bulk or mass polymerization, ABS is formed by dissolving an elastomeric component (i.e. a rubber) in the monomer mix, which contains styrene, acrylonitrile, an initiator and, frequently, a chain transfer agent such as a mercaptan or a terpinolene. The reaction can, however, be thermally initiated. The styrene and acrylonitrile monomers polymerize, some grafting to the rubber component, but most forming a monomer-polymer solution. As the relative volume of the monomer-SAN polymer phase increases, discrete rubber particles become dispersed in the matrix resulting from the monomer-SAN polymer phase. The rubber particles are stabilized by being grafted to SAN polymers at the interface between the particles and the SAN polymer matrix. Additional stabilization is furnished when monomer becomes occluded, and polymerizes, within the rubber particles. Because polymerization occurs completely within a monomer/polymer medium, viscosity increases as conversion increases. To allow continued agitation of the reaction mixture despite such increasing viscosity, diluents such as methyl ethyl ketone and ethylbenzene are added to the reactor. Upon the completion of polymerization, the melt is devolatilized using equipment such as a devolatilizing extruder or a flash evaporator, and vacuum is applied to remove unreacted monomers and diluents.

As is true of ABS made by the emulsion or suspension method, numerous substances can be used in the bulk method in place of, or conjunction with, styrene, examples of such substances being as follows: alpha-alkyl monovinylidene monoaromatic compounds, e.g. alpha-methylstyrene, alpha-ethylstyrene, alpha-methylvinyl-toluene; ring-substituted alkyl styrenes, e.g. vinyl toluene, o-ethylstyrene, p-ethylstyrene, 2,4-dimethylstyrene; ring-substituted halostyrenes, e.g., o-chlorostyrene, p-chlorostyrene, o-bromostyrene, 2,4-dichlorostyrene; ring-alkyl, ring-halo-substituted styrenes, e.g. 2-chloro-4-methylstyrene and 2,6-dichloro-4-methylstyrene; methacrylates such as methyl methacrylate; maleic acid and its esters and anhydrides; substituted aromatic maleimides such as N-phenyl maleimide; and mixtures of the foregoing. If so desired, mixtures of such monovinylidene aromatic monomers may be employed. Methacrylonitrile can also be used in combination with acrylonitrile. Bulk methods for the preparation of ABS, as described above, are discussed in greater detail in Kruse, U.S. Pat. No. 4,187,260, Simon, U.S. Pat. No. 4,252,911 and Weber, U.S. Pat. No. 4,526,926, each being hereby incorporated as a part hereof.

Another form which the rubber-modified styrene/acrylonitrile copolymer can take is an AES (acrylonitrile/EPDM/styrene) copolymer, which is obtained when SAN is grafted to a substrate made up of an EPDM (ethylene/propylene/non-conjugated diene) rubber. These AES copolymers are discussed in greater detail in Henton, U.S. Pat. No. 4,766,175, which is incorporated as a part hereof. SAN can also be crosslinked to an acrylate elastomer to form a rubber-modified styrene/acrylonitrile copolymer, as in the case of an ASA (acrylonitrile/styrene/$C_1$-$C_8$ alkyl acrylate) copolymer, which is discussed in greater detail in Yu, U.S. Pat. No. 3,944,631, being incorporated as a part hereof. Additionally, mixtures of the various copolymers described above can serve as the rubber-modified styrene/acrylonitrile copolymer of this invention.

The preferred rubber-modified styrene/ acrylonitrile copolymer for use herein are ABS, AES and ASA, and the preferred ABS and AES are those which are mass produced. As the rubber particles in a mass produced rubber-modified styrene/acrylonitrile copolymer have inclusions of glassy polymer running through them, they typically have a larger volume, in relation to the amount of rubber present, than they would have in the absence of the glassy polymer inclusions. Larger particle size is advantageous when low gloss in a molded part is sought because larger particles tend to diffuse light which strikes the surface of a part rather than reflect it. A mass produced rubber-modified styrene/acrylonitrile copolymer may be distinguished from a core-shell grafted copolymeric elastomer, which is made by the emulsion process.

The optional component (f) in the compositions of this invention is a core-shell graft copolymer. The graft copolymers suitable for use in this invention are of the core-shell type, contain more than 40 percent rubber, and are characterized in that their structure comprises an elastomeric core based substantially on either a diene or an acrylate, and a rigid grafted phase. These copolymers are further characterized in that the glass transition temperature of the elastomeric phase is below 0° C., and the elastomeric phase may optionally be at least partially crosslinked. The grafted phase typically comprises at least one monomer selected from acrylic esters of saturated aliphatic alcohols, methacrylic esters of saturated aliphatic alcohols, vinyl acetate, acrylonitrile, styrene and alkyl styrene.

A grafted core-shell copolymer based on diene rubber contains a substrate latex, or core, which is made by polymerizing a diene, preferably a conjugated diene, or by copolymerizing a diene with a mono-olefin or polar vinyl compound, such as styrene, acrylonitrile, or an alkyl ester of an unsaturated carboxylic acid such as methyl methacrylate. The substrate latex is typically made up of 40-85 percent diene, preferably a conjugated diene, and 15-60 percent of the mono-olefin or polar vinyl compound. The elastomeric core phase should have a glass transition temperature ("$T_g$") of less than 0° C., and preferably less than $-20°$ C. A mixture of monomers is then graft polymerized to the substrate latex. A variety of monomers may be used for this grafting purpose, of which the following are exemplary: vinyl compounds such as vinyl toluene or vinyl chloride; vinyl aromatics such as styrene, alphamethyl styrene or halogenated styrene; acrylonitrile, methacrylonitrile or alpha-halogenated acrylonitrile; a $C_1$-$C_8$ alkyl acrylate such as ethyl acrylate or hexyl acrylate; a $C_1$-$C_8$ alkyl methacrylate such as methyl methacrylate or hexyl methacrylate; acrylic or methacrylic acid; and the like or a mixture of two or more thereof.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for methyl methacrylate/butadiene/styrene copolymer ("MBS" rubber) is 60-80 parts by weight substrate latex, 10-20 parts by weight of each of the first and second monomer shells. A preferred formulation for an MBS rubber is one having a core built up from 71 parts of butadiene, 3 parts of styrene, 4 parts of methyl methacrylate and 1 part of divinyl benzene; a second phase of 11 parts of styrene; and a shell phase of 11 parts of methyl methacrylate and 0.1 part of 1,3-butylene glycol dimethacrylate, where the parts are by weight of the total composition. A diene-based, core-shell graft copolymer elastomer and methods for making same, as described above, are discussed in greater detail in Saito, U.S. Pat. No. 3,287,443, Curfman, U.S. Pat. No. 3,657,391, and Fromuth, U.S. Pat. No. 4,180,494.

A grafted core-shell copolymer based on an acrylate rubber has a first phase forming an elastomeric core and a second phase forming a rigid thermoplastic phase said elastomeric core. The elastomeric core is formed by emulsion or suspension polymerization of monomers which consist of at least 50 weight percent alkyl and/or aralkyl acrylates having up to fifteen carbon atoms, and, although longer chains may be used, the alkyls are preferably $C_2$-$C_6$, most preferably butyl acrylate. The elastomeric core phase should have a $T_g$ of less than 25° C., and preferably less than 0° C.

The rigid thermoplastic phase of the acrylate rubber is formed on the surface of the elastomeric core using suspension or emulsion polymerization techniques. The monomers necessary to create this phase together with necessary initiators are added directly to the reaction mixture in which the elastomeric core is formed, and polymerization proceeds until the supply of monomers is substantially exhausted. Monomers such as an alkyl ester of an unsaturated carboxylic acid, for example a $C_1$-$C_8$ alkyl acrylate like methyl acrylate, hydroxy ethyl acrylate or hexyl acrylate, or a $C_1$-$C_8$ alkyl methacrylate such as methyl methacrylate or hexyl methacrylate, or mixtures of any of the foregoing, are some of the monomers which can be used for this purpose. Either thermal or redox initiator systems can be used. Because of the presence of the graft linking agents on the surface of the elastomeric core, a portion of the chains which make up the rigid thermoplastic phase are chemically bonded to the elastomeric core. It is preferred that there be at least 20 percent bonding of the rigid thermoplastic phase to the elastomeric core.

A preferred acrylate rubber is made up of more than 40 percent to 95 percent by weight of an elastomeric core and 60 percent to 5 percent of a rigid thermoplastic phase. The elastomeric core can be polymerized from 75 percent to 99.8 percent by weight $C_1$-$C_6$ acrylate, preferably n-butyl acrylate. The rigid thermoplastic phase can be polymerized from at least 50 percent by weight of $C_1$-$C_8$ alkyl methacrylate, preferably methyl methacrylate. Acrylate rubbers and methods for making same, as described above, are discussed in greater detail in Owens, U.S. Pat. No. 3,808,180 and Witman, U.S. Pat. No. 4,299,928.

Preferred grafted core-shell copolymers containing more than forty percent (40%) rubber by weight are methacrylate/butadiene/styrene copolymer and acrylonitrile/butadiene/styrene copolymer.

A variety of additives may be used in the compositions of this invention for protection against thermal, oxidative and ultra-violet degradation. Such additives may be included in the composition at any point during the processing, and the choice as to which additive is employed, if any, is not critical to this invention. Representative of the thermal and oxidative stabilizers which can advantageously be utilized are hindered phenols, hydroquinones, phosphites, including substituted members of those groups and/or mixtures of more than one thereof. A preferred phenolic antioxidant is Irganox TM 1076 anti-oxidant, available from Ciba-Geigy Corp. Ultra-violet stabilizers such as various substituted resorcinols, salicylates, benzotriazoles, benzophines, hindered amines and hindered phenols can also be usefully included in the compositions of this invention, as can be lubricants, colorants, fillers such as talc, clay or mica, pigments, ignition resistant additives and mold release agents, and reinforcement agents such as fiberglass. Additives and stabilizers such as the foregoing, and many others which have not been mentioned, are known in the art, and the decision as to which, if any, to use is not critical to this invention. However, such additives, if used, typically do not exceed 5% by weight of the total composition, except fillers or reinforcing agents, which may constitute up to 40% of the composition.

*Illustrative Embodiments.* To illustrate the practice of this invention, examples of preferred embodiments are set forth below. It is not intended, however, that these examples (Examples 1–19) should in any manner restrict the scope of this invention. Some of the particularly desirable features of this invention may be seen by contrasting the characteristics of Examples 1–19 with those of controlled formulations (Controls A-K) which do not possess the features of, and are not therefore embodiments of, this invention.

The polycarbonate compositions prepared in Controls A-K and Examples 1–19 are made by dry blending the ingredients thereof and agitating same in a paint shaker for 7 minutes. The dry blended formulations are then melt mixed in a vented 30 mm Werner-Pfleiderer co-rotating, twin screw extruder using a 270° C. set temperature and 250 rpm. In the case of Examples 15–18, the extrusion was performed under vacuum. Each extruded composition is passed through a water bath, chopped into granules and collected for molding. Granules are thoroughly dried in a circulated air oven at 115° C. for six hours prior to molding. All samples are prepared by injection molding on a 75 ton Arburg molding machine. Molding temperatures for the barrel and mold are set at 280° C. and 170°–190° F., respectively.

The formulations of the polycarbonate compositions of Controls A-D and Examples 1–5 are shown below in Table II, those for Controls E-F and Examples 6–9 are shown in Table III, those for Controls G-K and Examples 10–13 are shown in Table IV, and those for Examples 14–19 are shown in Table V, all in parts by weight. In Tables II, III, IV and V:

"(1) PC. 300-10" is Calibre ®300-10 polycarbonate resin, a 10 melt flow value polycarbonate resin having a number average molecular weight of about 9,500 and a glass transition temperature of about 148° C., available from The Dow Chemical Company;

"(2) PET 9506" is cystalline polyethylene terephthalate having 0.95 inherent viscosity (measured in accordance with ASTM Designation D 4603-86), and a melting point of 254°–260° C., available as Traytuf® polyester from Goodyear Tire and Rubber Co.;

"(3) ABS X41" is a mass produced acrylonitrile-/butadiene/styrene copolymer containing approximately 20% rubber, available from The Dow Chemical Company;

"(4) E/GMA" is a copolymer containing ethylene and glycidyl methacrylate available from Sumitomo Chemical America as Bondfast ™ E copolymer;

"(5) E/VA/GMA" is a terpolymer containing ethylene, vinyl acetate and glycidyl methacrylate, available from Sumitomo Chemical America as Bondfast ™ 2B copolymer, having a weight-average molecular weight of approximately 100,000;

"(6) PA-2130" is a core-shell graft copolymer containing 75% rubber, available from M&T Chemical Co., wherein styrene and methyl methacrylate are grafted onto a butadiene core;

"(7) GRC" is a core-shell graft polymer impact modifier containing approximately 50% rubber wherein styrene and acrylonitrile is grafted onto a butadiene core;

"(8) Kraton ™ G 1651" is a hydrogenated styrene-/butadiene block thermoplastic elastomer copolymer from Shell Oil Company;

"(9) Hytrel ™ 5526" is a thermoplastic poly(butylene therephthalate)/poly(tetramethylene oxide) block copolymer where the PTMO soft segment blocks are of approximately 1,000 molecular weight units, available from DuPont;

"(10) AES" is Rovel © F-300 EPDM graft modified styrene/acrylonitrile copolymer having less than 30% rubber (where EPDM is ethylene/propyene/diene copolymer), available from The Dow Chemical Company;

"(11) TPU" is Pellethane © 2103-90A thermoplastic polyurethane having polyether blocks, available from The Dow Chemical Company; and "(12) E/GMAgSAN" is Modiper ™ A-4400 ethylene/glycidyl methacrylate copolymer to which blocks of styrene/acrylonitrile copolymer are randomly grafted in the amount of thirty percent by weight.

TABLE II

Content of Controls A to D and Examples 1 to 5 in parts by weight

| | A | B | C | D | 1 | 2 | 3 | 4 | 5 |
|---|---|---|---|---|---|---|---|---|---|
| (1) PC 300-10 | 1500 | 1500 | 1500 | 1200 | 1400 | 1400 | 1340 | 1300 | 1200 |
| (2) PET 9506 | 400 | 400 | 400 | 400 | 400 | 400 | 400 | 400 | 400 |
| (3) ABS X41 | — | — | 200 | — | — | — | — | 200 | 200 |
| (4) E/GMA | — | — | — | — | — | 100 | — | — | — |
| (5) E/VA/GMA | 100 | — | — | 100 | 100 | — | 100 | 100 | 100 |
| (6) PA 2130 | — | — | — | 300 | — | — | — | — | — |
| (7) GRC | — | — | — | — | — | — | 60 | — | — |
| (8) Kraton ™ G 1651 | — | 100 | — | — | 100 | 100 | 100 | — | 100 |

TABLE III

Content of Controls E to F and Examples 6 to 9 in parts by weight

| | E | F | 6 | 7 | 8 | 9 |
|---|---|---|---|---|---|---|
| (1) PC 300-10 | 1100 | 1150 | 950 | 900 | 1100 | 1040 |
| (2) PET 9506 | 700 | 700 | 700 | 700 | 700 | 700 |
| (3) ABS X41 | 200 | — | 200 | 200 | — | — |
| (5) E/VA/GMA | — | 150 | 150 | 100 | 100 | 100 |
| (7) GRC | — | — | — | — | — | 60 |
| (8) Kraton ™ G 1651 | — | — | — | 100 | 100 | 100 |

TABLE IV

Content of Controls G to K and Examples 10 to 13 in parts by weight

| | G | H | 10 | 11 | 12 | K | 13 |
|---|---|---|---|---|---|---|---|
| (1) PC 300-10 | 800 | 800 | 600 | 600 | 700 | — | 600 |
| (2) PET 9506 | 1000 | 1000 | 1000 | 1000 | 1000 | 900 | 600 |
| (3) ABS X41 | 200 | — | 200 | 200 | — | 900 | 600 |

TABLE IV-continued

Content of Controls G to K and Examples 10 to 13 in parts by weight

|  | G | H | 10 | 11 | 12 | K | 13 |
|---|---|---|---|---|---|---|---|
| (5) E/VA/GMA | — | 200 | 200 | 100 | 100 | 200 | 200 |
| (8) Kraton ™ G 1651 | — | — | — | 100 | 150 | — | — |

TABLE V

Content of Examples 14 to 19 in parts by weight

|  | 14 | 15 | 16 | 17 | 18 | 19 |
|---|---|---|---|---|---|---|
| (1) PC 300-10 | 1,200 | 1,200 | 1,200 | 1,340 | 1,200 | 1,200 |
| (2) PET 9506 | 400 | 400 | 400 | 400 | 400 | 400 |
| (3) ABS X41 | — | 200 | — | — | 200 | 200 |
| (4) E/GMA | — | — | — | — | — | — |
| (5) E/VA/GMA | 200 | 100 | 100 | 100 | 100 | — |
| (6) PA 2130 | — | — | — | — | — | — |
| (7) GRC | — | — | — | 60 | — | — |
| (8) Kraton ™ G 1651 | — | — | — | — | — | — |
| (9) Hytrel ™ 5526 | — | 100 | 100 | 100 | — | — |
| (10) AES | 200 | — | 200 | — | — | — |
| (11) TPU | — | — | — | — | 100 | — |
| (12) E/GMA/SAN | — | — | — | — | — | 200 |

The results of tests performed on the blended polycarbonate compositions of Controls A-K and Examples 1-19 are shown below in Tables VI-IX.

Impact resistance is measured by the Izod test according to ASTM Designation D 256-84 (Method A). The notch is 10 mils (0.254 mm) in radius. An inverted T (⊥) indicates that the notch is cut so that the flexural shock caused by the striking nose of the pendulum is propagated parallel to the direction of flow taken by the molten extrudate during formation of the sample. Vertical parallel lines (||) indicate that the notch is cut so that the flexural shock caused by the striking nose of the pendulum is propagated perpendicular to the direction of flow taken by the molten extrudate during formation of the sample. The result is sometimes referred to below as the "Izod value".

Weldline Izod strength is also measured according to ASTM Designation D 256-84 (Method A), but with respect to a sample which has been formed with a butt weld in a double gated mold. The sample is unnotched, and it is placed in the vise so that the weld is coincident with the top surface of the vise jaws. The result is sometimes referred to below as the "weldline Izod value".

Flexural modulus is measured in accordance with ASTM Designation D 790-84a.

Deflection temperature under load ("DTUL") is measured in accordance with ASTM Designation D 648-82 at 66 psi.

Specular gloss is measured according to ASTM Designation D 523-85 using a Dr. Bruno Lange Reflectometer RB. The beam axis angle is 20°.

TABLE VI

Test Results for Controls A to D and Examples 1 to 5

|  | A | B | C | D | 1 | 2 | 3 | 4 | 5 |
|---|---|---|---|---|---|---|---|---|---|
| 20° Gloss | 4 | 93 | 89 | 6 | 5 | 4 | 4 | 16 | 6 |
| 60° Gloss | 24 | 103 | 101 | 45 | 26 | 30 | 24 | 54 | 39 |
| Izod, ⊥, 23° C., ft-lb/in | 12.8 | 11.6 | 2.8 | 9.9 | 12.6 | 12.2 | 14.3 | 12.9 | 12.2 |
| Izod, ⊥, 0° C., ft-lb/in | 4.2 | 6.6 | — | 7.3 | 11.9 | 12.0 | 14.8 | 12.3 | 9.9 |
| Izod, ||, 23° C., ft-lb/in | 13.4 | 15.0 | 9.6 | 11.3 | 14.5 | 14.4 | 13.9 | 16.2 | 17.1 |
| Izod, ||, 0° C., ft-lb/in | 3.9 | 7.8 | 4.0 | 7.3 | 9.0 | 13.0 | 15.7 | 14.7 | 15.8 |
| Izod, ||, −20° C., ft-lb/in | — | 2.8 | — | 3.8 | 6.4 | 4.2 | 7.3 | 5.6 | — |
| Weldline Izod, ft-lb/in | 46 | 5 | 4 | 26 | 28 | 21 | 30 | 6 | 4 |
| DTUL, °C. | 274 | 273 | 266 | 243 | 270 | 270 | 268 | 270 | 257 |
| Flexural Modulus, psi × 10⁵ | 3.66 | 3.38 | 3.91 | 2.08 | 2.93 | 2.80 | 2.85 | 3.06 | 3.08 |

TABLE VII

Test Results for Controls E to F and Examples 6 to 9

|  | E | F | 6 | 7 | 8 | 9 |
|---|---|---|---|---|---|---|
| 20° Gloss | 96 | 7 | 16 | 10 | 20 | 6 |
| 60° Gloss | 105 | 42 | 66 | 58 | 54 | 40 |
| Izod, ⊥, 23° C., ft-lb/in | 1.8 | 2.6 | 15.4 | 12.9 | 14.3 | 13.4 |
| Izod, ⊥, 0° C., ft-lb/in | — | — | 4.8 | 7.7 | 12.9 | 14.6 |
| Izod, ||, 23° C., ft-lb/in | 3.0 | 2.4 | 16.9 | 16.9 | 14.5 | 16.1 |
| Izod, ||, 0° C., ft-lb/in | — | — | 15.5 | 17.1 | 12.9 | 15.9 |
| Izod, ||, −20° C., ft-lb/in | — | — | 3.7 | 6.1 | 7.8 | 12.0 |
| Weldline Izod, ft-lb/in | 3 | 23 | 5 | 6 | 26 | 26 |
| Flexural Modulus, psi × 10⁵ | 3.87 | 2.82 | 2.82 | 2.88 | 3.02 | — |

TABLE VIII

Test Results for Controls G to K and Examples 10 to 13

|  | G | H | 10 | 11 | 12 | K | 13 |
|---|---|---|---|---|---|---|---|
| 20° Gloss | 95 | 16 | 12 | 7 | 3 | 13 | 23 |
| 60° Gloss | 104 | 66 | 62 | 49 | 31 | 69 | 83 |
| Izod, ⊥, 23° C., ft-lb/in | 0.9 | 2.9 | 16.6 | 8.6 | 14.1 | 1.0 | 2.2 |
| Izod, ⊥, 0° C., ft-lb/in | — | — | 3.2 | 3.9 | 5.4 | — | — |
| Izod, ||, 23° C., ft-lb/in | 1.9 | 2.9 | 18.4 | 19.2 | 12.4 | 1.9 | 6.1 |
| Izod, ||, 0° C., ft-lb/in | — | — | 2.9 | 5.4 | 4.8 | — | — |

TABLE VIII-continued

Test Results for Controls G to K and Examples 10 to 13

|  | G | H | 10 | 11 | 12 | K | 13 |
|---|---|---|---|---|---|---|---|
| Weldline Izod, ft-lb/in | 2 | 24 | 6 | 6 | 18 | 1 | 2 |
| Flexural Modulus, psi × 10⁵ | 3.93 | 2.65 | 2.70 | 2.75 | — | 3.03 | 2.63 |

TABLE IX

Test Results for Examples 14 to 19

|  | 14 | 15 | 16 | 17 | 18 | 19 |
|---|---|---|---|---|---|---|
| 20° Gloss | 6 | 64 | 35 | 76 | 16 | 13 |
| 60° Gloss | 45 | 95 | 85 | 97 | 72 | 58 |
| Izod, ⊥, 23° C., ft-lb/in | 12.7 | 13.4 | 13.2 | 14.4 | 10.1 | 9.5 |
| Izod, ⊥, 0° C., ft-lb/in | 4.7 | 11.1 | 9.4 | 12.9 | 3.5 | — |
| Izod, ‖, 23° C., ft-lb/in | 14.7 | 14.9 | 16.3 | 15.9 | 13.5 | 11.4 |
| Izod, ‖, 0° C., ft-lb/in | 4.7 | 13.3 | 15.5 | 14.7 | 4.4 | — |
| Izod, ‖, −20° C., ft-lb/in | — | 4.8 | 5.2 | 13.5 | — | — |
| Weldline Izod, ft-lb/in | 4 | 6 | 5 | 31 | 4 | — |
| Flexural Modulus, psi × 10⁵ | 2.62 | 3.19 | 3.03 | 2.95 | 3.17 | — |

It can be seen from these test results that, when an olefinic epoxide-containing modifier is added to a blend of polycarbonate, crystalline polyester and a thermoplastic, hydrogenated vinyl aromatic/diene block copolymer, the resulting composition displays, when molded, a much lower gloss and much higher weldline Izod value. For example, Control B has a 20° gloss of 93 and a weldline Izod of 5 ft-lb/in whereas Examples 1 and 2 have, respectively, a gloss of 5 and 4, and a weldline of 28 and 21 ft-lb/in. It should also be noted that Control B was extruded with difficulty because of die swell, strand drops occurred during compounding, and test pieces molded from Control B showed signs of delamination.

Contrary to expectation based on the art, these results show that a thermoplastic, hydrogenated vinyl aromatic/diene block copolymer is an effective thermoplastic elastomer in a polycarbonate/crystalline polyester blend when an olefinic epoxide-containing modifier is also present in the composition.

In a transmission electron micrograph ("TEM") of Example 1, which has a scale of 9 mm=1 micron, the polycarbonate is grey, the polyester is white, and the ethylene/vinyl acetate/glycidyl methacrylate copolymer (in which the hydrogenated styrene/butadiene/styrene block copolymer is dispersed), is black. The average particle size of the ethylene/vinyl acetate/glycidyl methacrylate copolymer containing the dispersed thermoplastic elastomer in such a TEM is greater than 0.75 micron. By contrast, it should be noted that, when a composition such as Control B is micrographed, the hydrogenated styrene/butadiene block copolymer appears in the form of elongated sheets or ribbons rather than as particles, and, when the block copolymer is in this form, delamination and poor adhesion with polycarbonate may result.

It can also be seen that, when an olefinic epoxide-containing modifier is added to a blend of polycarbonate, crystalline polyester and a rubber-modified styrene/acrylonitrile copolymer, the resulting composition displays, when molded, a much lower gloss and much higher Izod impact value, and is more easily processed. For example, Control C has a 20° gloss of 89° and a 23° C. Izod impact of 2.8 ft-lb/in whereas Example 4 has a gloss of 16 and an Izod impact of 12.9 ft-lb/in. A comparison of Control E with Example 6 and of Control G with Example 10 shows similar results. The rubber-modified styrene/acrylonitrile copolymer is also effective to improve Izod values and flexural modulus while maintaining a good balance of other properties when it replaces a core-shell graft impact modifying copolymer in a composition which also contains polycarbonate, crystalline polyester and an olefinic epoxide-containing modifier. This may be seen by comparing Control D to Example 4.

The presence of a rubber-modified styrene/acrylonitrile copolymer in a polycarbonate/polyester blend improves the processibility of the blend. However, as shown in Control C., it also results in lower weldline strength, higher gloss and only a minor improvement in impact strength. By contrast, Example 4 shows that when an olefinic epoxide-containing modifier is also present in the composition, substantially more favorable values for gloss and weldline and impact strength are acieved without loss of processibility.

It is within the skill in the art to practice this invention in numerous modifications and variations in light of the above teachings. It is, therefore, to be understood that the various embodiments of this invention described herein may be altered without departing from the spirit and scope of this invention as defined by the appended claims.

What is claimed is:

1. A composition of matter comprising, in admixture,
   (a) an aromatic polycarbonate,
   (b) a crystalline aromatic polyester,
   (c) a thermoplastic epoxide-containing copolymer, having a glass transition temperature of less than 0° C., prepared from (i) one or more olefin monomers, and (ii) at least one vinyl monomer carrying at least one epoxide group, and
   (d) a thermoplastic block copolymer containing a rigid block polymerized from a vinyl aromatic compound and a rubbery block polymerized from a diene, in which component (d), the block copolymer, is dispersed in particles of component (c), the epoxide-containing copolymer.

2. The composition of claim 1 wherein component (c) further comprises (c)(iii) at least one vinyl monomer not carrying an epoxide group.

3. The composition of claim 1 or 2 wherein component (d), the thermoplastic block copolymer, is a linear A-B-A triblock copolymer, a linear A-B diblock copolymer, a radial A-B block copolymer, or a mixture thereof.

4. The composition of claim 3 wherein, in component (d), the block "A" is polymerized from styrene and the block "B" is polymerized from butadiene, isoprene or a mixture thereof.

5. The composition of claim 3 wherein the block copolymer is hydrogenated.

6. The composition of claim 4 wherein the block copolymer is hydrogenated.

7. The composition of claim 1 or 2 further comprising one or more members of the group consisting of (i) a rubber-modified styrene/acrylonitrile copolymer containing less than forty percent rubber by weight, (ii) a core-shell graft copolymer containing more than forty percent rubber by weight, (iii) butyl rubber, (iv) ethylene/propylene copolymer, (v) ethylene/propylene/diene copolymer, (vi) neoprene, (vii) nitrile rubber, (viii) polybutadiene and (ix) polyisoprene.

8. The composition of claim 7 wherein the rubber portion of the rubber-modified styrene/acrylonitrile copolymer comprises one or more members of the group consisting of a diene, ethylene/propylene/diene copolymer and an alkyl acrylate.

9. The composition of claim 7 wherein the rubber-modified styrene/acrylonitrile copolymer is a mass produced acrylonitrile/butadiene/styrene copolymer.

10. The composition of claim 7 wherein the rubber-modified styrene/acrylonitrile copolymer is a mass produced acrylonitrile/EPDM/styrene copolymer where EPDM is ethylene/propylene/diene copolymer.

11. The composition of claim 2 wherein component (c)(iii), at least one vinyl monomer not carrying an epoxide group, is grafted as a polymer chain to component (c), the epoxide-containing copolymer.

12. The composition of claim 11 wherein said grafted polymer chain comprises styrene, acrylonitrile, vinyl acetate, methyl methacrylate, or a mixture thereof.

13. The composition of claim 1 or 2 further comprising a filler.

14. The composition of claim 13 wherein the filler is talc, clay, mica, glass or a mixture thereof.

15. The composition of claim 1 or 2 in the form of a molded article. In a transmission electron micrograph ("TEM") of Example 1, which has a scale of 9 mm=1 micron, the polycarbonate is grey, the polyester is white, and the ethylene/vinyl acetate/glycidyl methacrylate copolymer (in which the hydrogenated styrene/butadiene/styrene block copolymer is dispersed), is black. The average particle size of the ethylene/vinyl acetate/glycidyl methacrylate copolymer containing the dispersed thermoplastic elastomer in such a TEM is greater than 0.75 micron. By contrast, it should be noted that, when a composition such as Control B is micrographed, the hydrogenated styrene/butadiene block copolymer appears in the form of elongated sheets or ribbons rather than as particles, and, when the block copolymer is in this form, delamination and poor adhesion with polycarbonate may result.

16. The composition of claim 1 or 2 wherein component (c)(ii), the vinyl monomer carrying at least one epoxide group, is a glycidyl ester of an unsaturated carboxylic acid.

17. The composition of claim 1 wherein
(a) the polycarbonate is a Bisphenol-A polycarbonate,
(b) the polyester is a poly(alkylene terephthalate),
(c) the epoxide-containing copolymer is ethylene/glycidyl methacrylate copolymer, and
(d) the block copolymer is a hydrogenated styrene/butadiene block copolymer.

18. The composition of claim 2 wherein
(a) the polycarbonate is a Bisphenol-A polycarbonate,
(b) the polyester is a poly(alkylene terephthalate),
(c) the epoxide-containing copolymer is ethylene/vinyl acetate/glycidyl methacrylate terpolymer, ethylene/butyl acrylate/glycidyl methacrylate terpolymer, or a mixture thereof, and
(d) the block copolymer is a hydrogenated styrene/butadiene block copolymer.

* * * * *